United States Patent [19]

Cody

[11] Patent Number: 5,167,090
[45] Date of Patent: Dec. 1, 1992

[54] FLYING INSECT KILLER APPARATUS

[76] Inventor: Patton J. Cody, Rte. 1, Box 441, Lexington, Ala. 35648

[21] Appl. No.: 797,415

[22] Filed: Nov. 21, 1991

[51] Int. Cl.$^5$ ............................................. A01M 1/04
[52] U.S. Cl. ...................................................... 43/139
[58] Field of Search ............... 43/139, 140, 113, 132.1

[56] References Cited

U.S. PATENT DOCUMENTS

| | | | |
|---|---|---|---|
| 1,671,404 | 5/1928 | Cherry | 43/139 |
| 2,780,026 | 2/1957 | Dail et al. | 43/139 |
| 2,826,321 | 9/1957 | Blackman | 43/139 |
| 2,829,384 | 4/1958 | Stadler | 43/139 |
| 3,041,773 | 7/1962 | Gagliano | 43/139 |
| 3,152,420 | 10/1964 | Pawl | 43/139 |
| 3,196,577 | 7/1965 | Plunkett | 43/139 |
| 4,819,370 | 4/1989 | Woodruff | 43/139 |

FOREIGN PATENT DOCUMENTS 172636  10/1934  Switzerland ........................... 43/139

Primary Examiner—Kurt C. Rowan
Attorney, Agent, or Firm—Leon Gilden

[57] ABSTRACT

A housing is provided with a fan directed through a forward wall of the housing in communication with a rear wall of the housing through a central connecting conduit, with the connecting conduit including a diverting conduit directed through a diverting funnel to project insect attractant through the forward wall of the housing. The housing includes a switch to effect operation of an associated fan to project flying insects through the fan killing said insects and directing the insects through a rear wall of the housing. A modification of the invention includes the fan blades removably mounted relative to the hub filled with a pesticide, wherein the pesticide is deposited about the housing wall opening to further effect killing of the flying insects directed through the forward wall of the housing.

3 Claims, 4 Drawing Sheets

FLYING INSECT KILLER APPARATUS

BACKGROUND OF THE INVENTION

1. Field of the Invention

The field of invention relates to insect killing apparatus, and more particularly pertains to a new and improved flying insect killer apparatus wherein the same is arranged for the killing and removal of flying insects relative to a living environment.

2. Description of the Prior Art

Various insect killing apparatus of various construction types is utilized throughout the prior art to remove undesirable insects from a living environment. Such apparatus is exemplified in the U.S. Pat. No. 4,635,393 to Pfeffer, Sr., et al. setting forth an electric insect killer.

A further example of an electrical grid to electrocute insects is set forth in U.S. Pat. No. 3,894,351 to Iannini; U.S. Pat. No. 3,464,144 to Kannett, and U.S. Pat. No. 4,387,529 to Hedstrom.

As such, it may be appreciated that there continues to be a need for a new and improved flying insect killer apparatus as set forth by the instant invention which addresses both the problems of ease of use as well as effectiveness in construction in the ease of removal of flying insects mechanically relative to a living environment and in this respect, the present invention substantially fulfills this need.

SUMMARY OF THE INVENTION

In view of the foregoing disadvantages inherent in the known types of insect killer apparatus now present in the prior art, the present invention provides a flying insect killer apparatus wherein the same is arranged to direct insects through chopping fan blades to kill such insects relative to a living environment. As such, the general purpose of the present invention, which will be described subsequently in greater detail, is to provide a new and improved flying insect killer apparatus which has all the advantages of the prior art insect killer apparatus and none of the disadvantages.

To attain this, the present invention provides a housing with a fan directed through a forward wall of the housing in communication with a rear wall of the housing through a central connecting conduit, with the connecting conduit including a diverting conduit directed through a diverting funnel to project insert attractant through the forward wall of the housing. The housing includes a switch to effect operation of an associated fan to project flying insects through the fan killing said insects and directing the insects through a rear wall of the housing. A modification of the invention includes the fan blades removably mounted relative to the hub filled with a pesticide, wherein the pesticide is deposited about the housing wall opening to further effect killing of the flying insects directed through the forward wall of the housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical diclosure of the application. The abstract is neither intended to define the invention of the application, which is measured by the claims, nor is it intended to be limiting as to the scope of the invention in any way.

It is therefore an object of the present invention to provide a new and improved flying insect killer apparatus which has all the advantages of the prior art insect killer apparatus and none of the disadvantages.

It is another object of the present invention to provide a new and improved flying insect killer apparatus which may be easily and efficiently manufactured and marketed.

It is a further object of the present invention to provide a new and improved flying killer insect apparatus which is of a durable and reliable construction.

An even further object of the present invention is to provide a new and improved flying insect killer apparatus which is susceptible of a low cost of manufacture is then susceptible of low prices of sale to the consuming public, thereby making such flying insect killer apparatus economically available to the buying public.

Still yet another object of the present invention is to provide a new and improved flying insect killer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
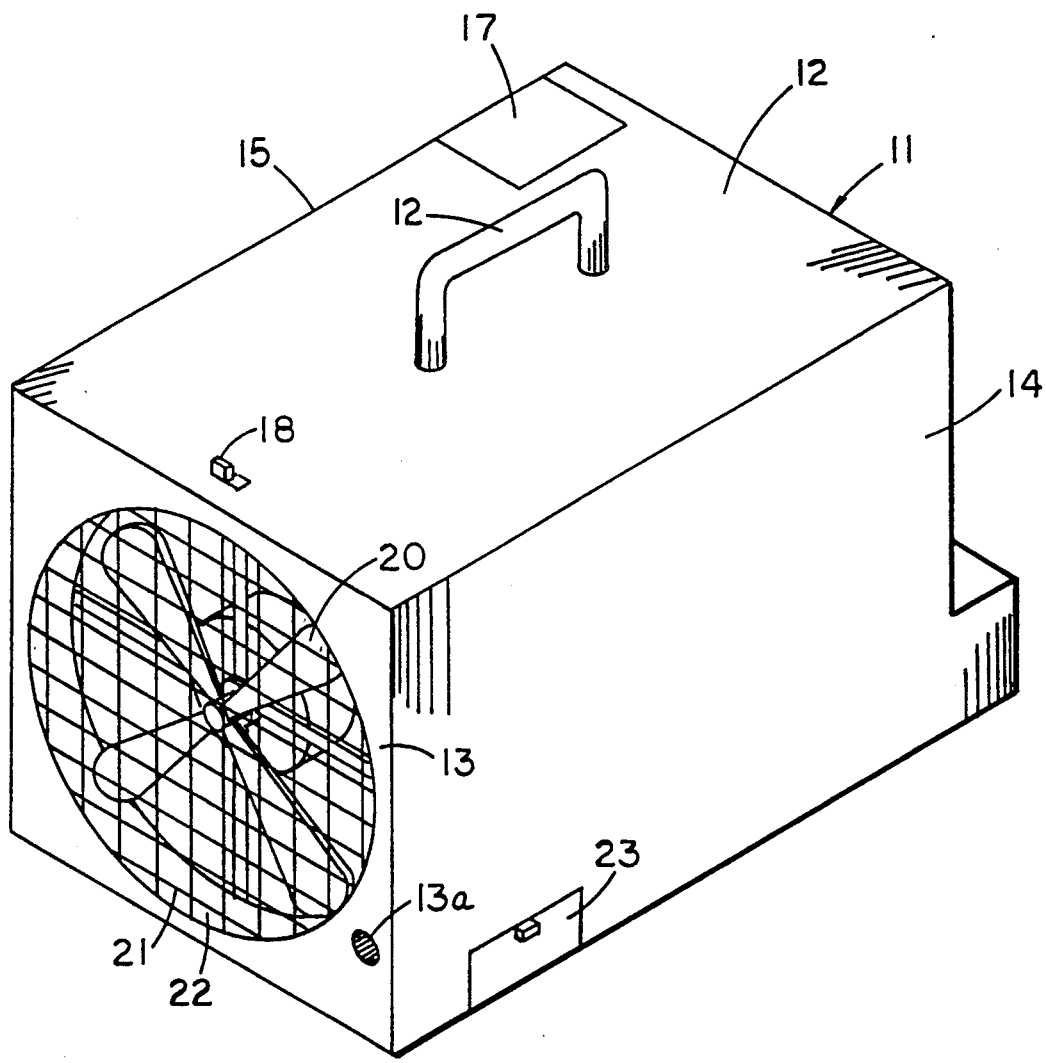
FIG. 1 is an isometric illustration of the instant invention.

With reference now to the drawings, and in particular to FIGS. 1 to 6 thereof, a new and improved flying insect killer apparatus embodying the principles and concepts of the present invention and generally designated by the reference numerals 11-38 will be described.

Figure 2:
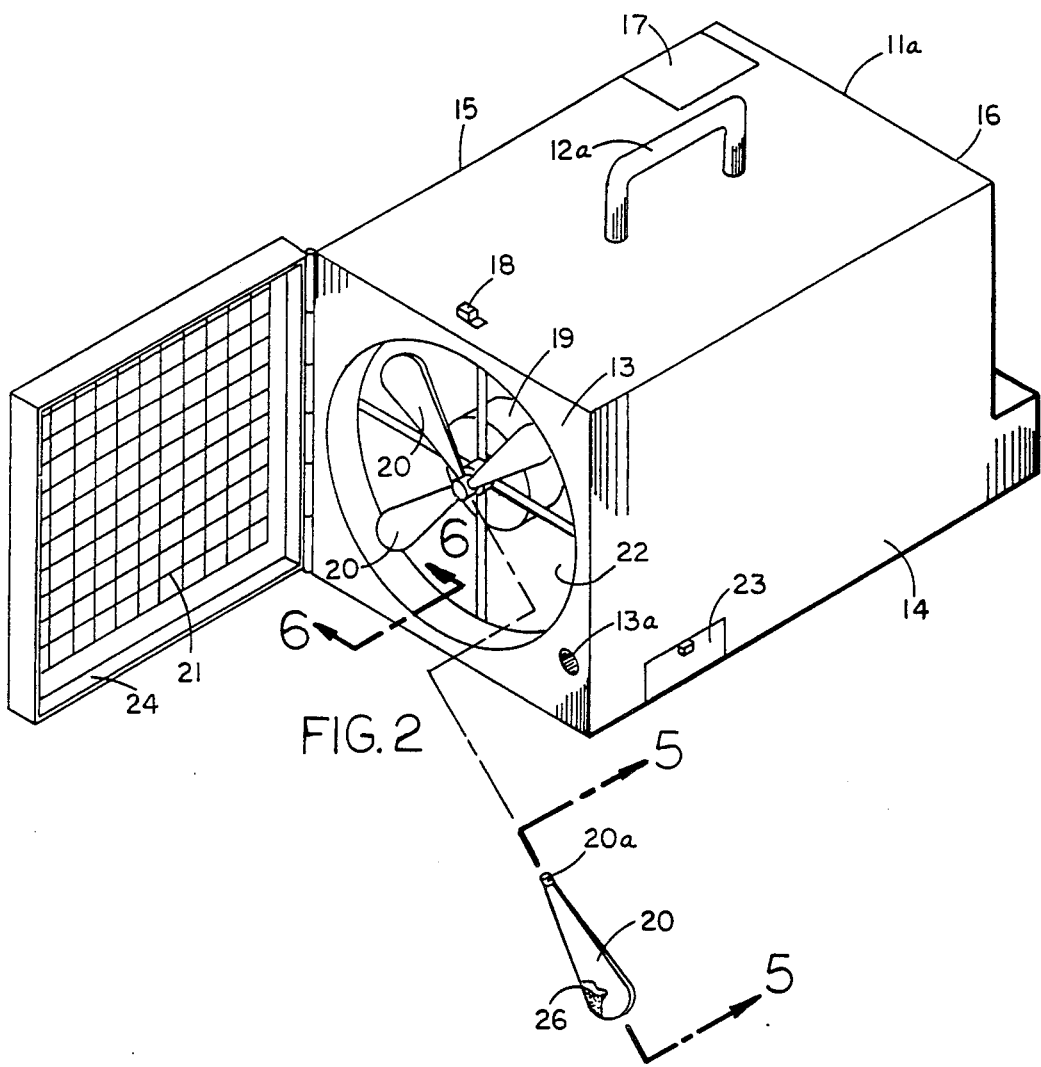
FIG. 2 is a isometric illustration of a modified housing structure of the instant invention.
Figure 3:
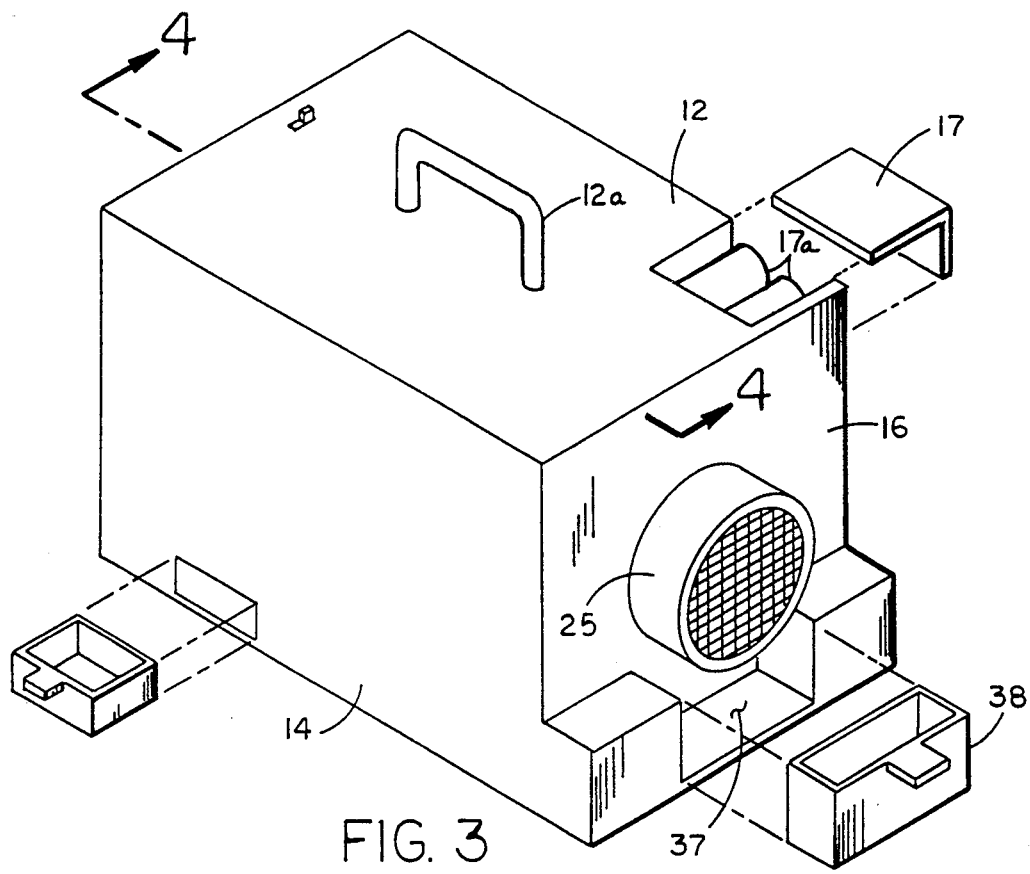
FIG. 3 is an isometric rear view of the invention.
Figure 4:
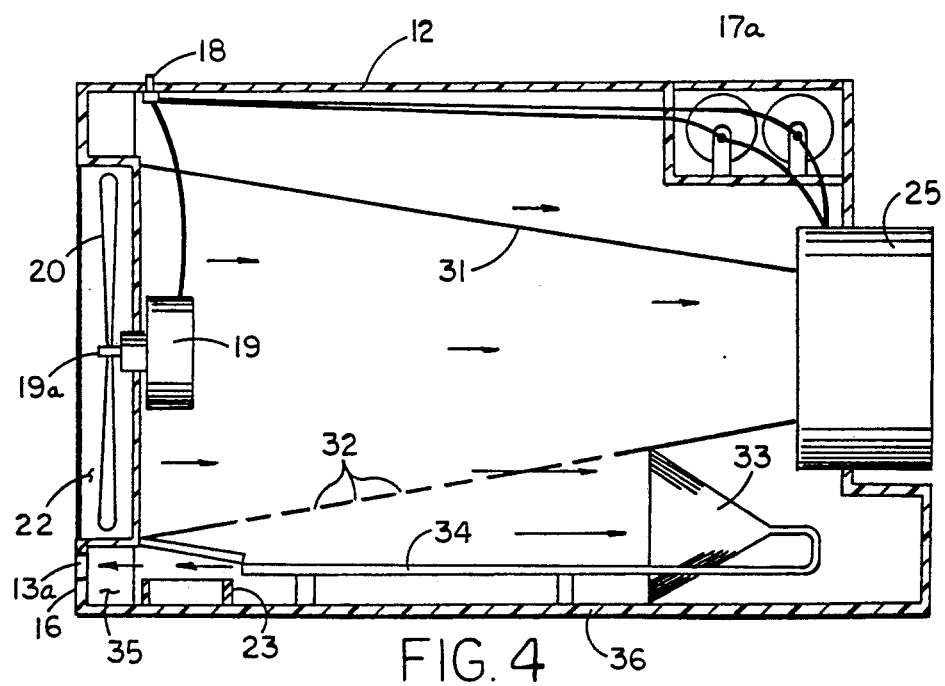
FIG. 4 is an orthographic view, taken along the lines 4—4 of FIG. 3 in the direction indicated by the arrows.
Figure 5:
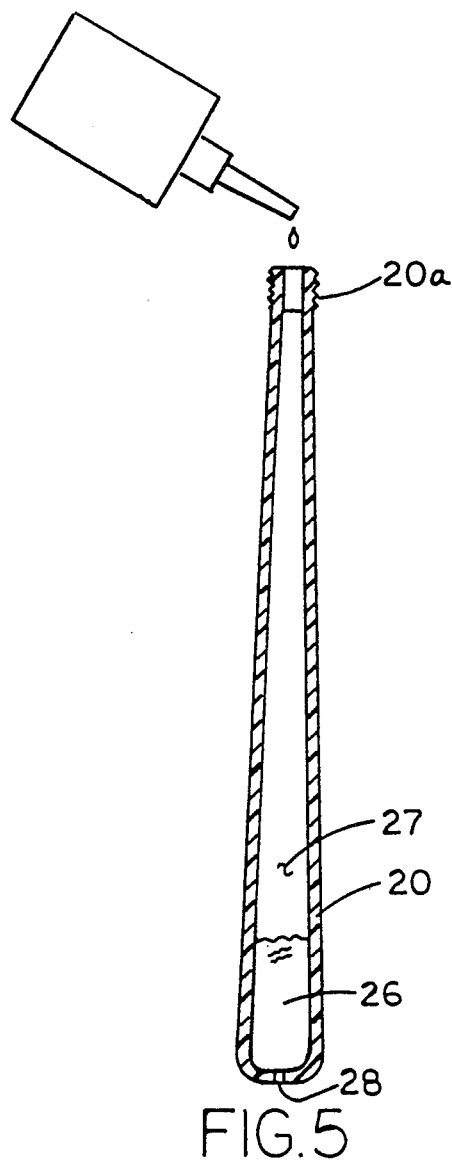
FIG. 5 is an orthographic view, taken 5—5 of FIG. 2 in the direction indicated by the arrows.
Figure 6:
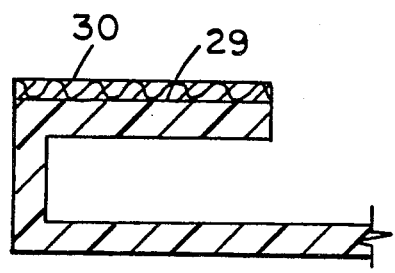
FIG. 6 is an orthographic view, taken along the lines 6—6 of FIG. 2 in the direction indicated by the arrows.

More specifically, the flying insect killer apparatus of the instant invention essentially includes a rigid housing 11 defined by a top wall 12, a front wall 13, a first side wall 14, a second side wall 15, a rear wall 16, as well as a housing floor 36 (see FIG. 4). A battery compartment door 17 is directed through the top wall for access to an underlying compartment to contain a plurality of batteries 17a therewithin. An on/off switch 18 mounted to the housing to the top wall 12 as illustrated, but to any of the wall structure, is operative to effect selective actuation of an associated fan motor 19 mounted adjacent and rearwardly of the front wall 13 coaxially aligned relative to a front wall fan opening 22. The fan motor 19 includes fan blades 20 mounted relative to a fan motor hub 19a. The fan blades 20 are positioned rearwardly of a fan grid 21 directed over the opening 22, as illustrated. As illustrated in FIG. 2, a front wall door framework 24 is arranged to contain the grid 21 therewithin hingedly mounted spaced from in a parallel relationship relative to the front wall. A rear wall exit duct 25 is coaxially aligned relative to the front wall fan opening 22, wherein a fan conduit channel 31 is directed coextensively between the front wall fan opening 22 and the rear wall exit duct 25 that has its outlet opening spaced above a rear wall recess 37 that projects forwardly of the rear wall 16, wherein the recess 37 receives a recess cup 38 to receive insect debris therewithin directed through the exit duct 25.

As illustrated in the FIGS. 1 and 4 for example, a first side wall bait cup 23 is slidably directed through the first side wall contiguous with the floor positioned within a bait cup chamber that is positioned between the floor 36 and the fan conduit channel 31 to receive pressurized air flow thereover. The pressurized air flow is directed from pressurized air directed rearwardly into the fan conduit channel 31 and through fan conduit channel openings 32 that are positioned in confrontation with the floor 36. The air thusly diverted is directed into an air diverting funnel 33 positioned between the fan conduit channel 31 and the floor 36 that in turn is in pneumatic communication with an air diverting funnel conduit 34 that is projected forwardly and into adjacency relative to the bait cup 23 to direct the air over the bait cup into the bait cup chamber 35 and thereafter through the front wall conduit exit port 13a. This provides for attractant directed relative to the housing to direct flying insects relative to the housing 11 and 11a.

A modified fan structure, as illustrated in FIG. 2, includes the fan blades 20 formed with fan blade threaded first ends 20a threadedly mounted relative to the fan motor hub 19a to permit the filling of each fan blade that includes a fan blade cavity 27 with an associated pesticide fluid 26. A fan blade dispensing port 28 positioned at a second distal end of the fan blade 20 relative to the first distal end of the fan blade including the threaded first end defining an entrance into the cavity 27 directs the pesticide into the front wall fan opening 22, and more specifically to the fan opening cylindrical opening wall 29 that in turn includes a fibrous liner 30 to receive the fluid thereon during rotation of the blades projecting the fluid from the cavity 27 by means of centrifugal force.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A flying insect killer apparatus, comprising,
a rigid housing, the rigid housing including a top wall spaced from a housing floor, and
a first side wall spaced from a second side wall, a rear wall, and a front wall, the front wall including a front wall fan opening, and a fan motor mounted within the housing adjacent the front wall fan opening coaxially aligned therewith, and
actuation means to effect selective actuation of the fan motor, and
the front wall fan opening including a fan opening cylindrical wall, and
the fan motor including a fan motor hub, and a plurality of fan blades mounted to the fan motor hub within the fan opening cylindrical wall, and
the rear wall including a rear wall exit duct, and
a fan conduit channel coextensively directed between the front opening cylindrical wall and the rear wall duct directed through the rear wall, and
the rear wall includes a rear wall recess positioned below the rear wall duct, the rear wall recess including a recess cup removably mounted relative to the recess below the rear wall duct, and
a fan grid mounted forwardly of the fan blades adjacent the front wall, and
the fan conduit channel includes a plurality of fan conduit channel openings directed therethrough in confrontation to and above the housing floor, and
an air diverting funnel mounted between the fan conduit channel and the housing floor forwardly of the fan conduit channel openings to receive air through the fan conduit channel openings, and an air diverting funnel conduit in pneumatic communication with the air diverting funnel directed from the air diverting funnel above the housing floor and below the fan conduit channel and terminating in a spaced relationship relative to the front wall, wherein a bait cup chamber is oriented between the air diverting funnel conduit, the front wall, and between the housing floor, and the fan conduit channel, and a bait cup slidably directed through the first side wall in contiguous communication with the housing floor and positioned within the bait cup chamber adjacent the air diverting frontal conduit, and a front wall conduit exit port is directed through the front wall into the bait cup chamber to direct pressurized air from the bait cup chamber through the front wall conduit exit port.

2. An apparatus as set forth in claim 1 wherein each fan blade is hollow defining a fan blade cavity, and each fan blade includes a first distal end formed with a threaded exterior surface threadedly received by the fan motor hub, and a second distal end spaced from the first distal end includes a fan blade opening, and fluid pesticide is arranged within the fan blade cavity and projected through the second distal end upon rotation of the fan blades.

3. An apparatus as set forth in claim 1 wherein the fan opening cylindrical wall includes a fibrous liner coextensively mounted to the fan opening cylindrical wall to receive the pesticide fluid therewithin.

* * * * *